United States Patent [19]

Rollmann et al.

[11] 4,374,093
[45] Feb. 15, 1983

[54] CONTINUOUS-STREAM UPFLOW ZEOLITE CRYSTALLIZATION APPARATUS

[75] Inventors: Louis D. Rollmann, Princeton, N.J.; Ernest W. Valyocsik, Yardley, Pa.

[73] Assignee: Mobil Oil Corporation, New York, N.Y.

[21] Appl. No.: 296,600

[22] Filed: Aug. 26, 1981

Related U.S. Application Data

[63] Continuation-in-part of Ser. No. 236,090, Feb. 20, 1981, abandoned, which is a continuation of Ser. No. 47,536, Jun. 11, 1979, abandoned.

[51] Int. Cl.³ .............................................. B01D 9/02
[52] U.S. Cl. .................................... 422/202; 422/112; 422/113; 422/199; 422/226; 422/228; 422/245; 422/250; 422/253
[58] Field of Search .............. 422/112, 113, 245, 250, 422/253, 225, 226, 229, 233, 228, 199, 202

[56] References Cited

U.S. PATENT DOCUMENTS

| | | | |
|---|---|---|---|
| 2,375,730 | 5/1945 | Caldwell et al. | 422/113 |
| 2,904,607 | 9/1959 | Mattox et al. | 423/329 X |
| 2,926,182 | 2/1960 | Sutton | 260/413 |
| 2,986,587 | 5/1961 | Hess et al. | 422/245 X |
| 3,160,669 | 12/1964 | Terao et al. | 422/225 X |
| 3,388,142 | 6/1968 | Cameron et al. | 422/225 X |
| 3,472,630 | 10/1969 | Baldwin et al. | 422/225 X |
| 3,603,103 | 9/1971 | Richmond et al. | 62/124 |
| 3,607,392 | 9/1971 | Lauer et al. | 422/245 X |
| 3,702,886 | 11/1972 | Argauer et al. | 423/328 |
| 3,829,293 | 8/1974 | Waquier et al. | 23/273 R |
| 3,865,922 | 2/1975 | Boontje | 422/245 X |
| 3,900,955 | 8/1975 | Peterson | 422/112 X |

FOREIGN PATENT DOCUMENTS

| | | | |
|---|---|---|---|
| 935431 | 8/1963 | United Kingdom | 422/112 |
| 1246277 | 9/1971 | United Kingdom | 422/253 |

*Primary Examiner*—Barry S. Richman
*Attorney, Agent, or Firm*—Charles A. Huggett; Michael G. Gilman; Stanislaus Aksman

[57] ABSTRACT

A continuous-stream zeolite crystallization apparatus comprising a combination of a tubular reactor, a central stirring element contained therein, ingress and egress means for the reactor for charging crystalline zeolite forming reactants therein and recovering crystallized zeolites therefrom, respectively, recovery vessels for collecting and processing crystallized zeolites continuously, the reactor and recovery vessels optionally being subjected to a controlled pressure system.

11 Claims, 4 Drawing Figures

CONTINUOUS-STREAM UPFLOW ZEOLITE CRYSTALLIZATION APPARATUS

CROSS REFERENCES TO RELATED APPLICATIONS

This is a continuation-in-part of a copending application Ser. No. 236,090, filed Feb. 20, 1981, now abandoned, which was a continuation of application Ser. No. 047,536, filed June 11, 1979, now abandoned.

BACKGROUND OF THE INVENTION

1. Field of the Invention

This invention relates to an apparatus for a continuous production of a crystalline zeolite material, and more particularly to an apparatus for a continuous upflow crystalline zeolite material production.

2. Description of the Prior Art

Zeolitic materials, both natural and synthetic, have been demonstrated in the past to have catalytic properties for various types of hydrocarbon conversions. Certain zeolitic materials are ordered, porous crystalline aluminosilicates having a definite crystalline structure within which there are a large number of channels. These cavities and channels are precisely uniform in size. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as a rigid three-dimensional framework of $SiO_4$ and $AlO_4$ in which the tetrahedra are cross-linked by the sharing of oxygen atoms whereby the ratio of the total aluminum and silicon atoms to oxygen is 1:2. The electrovalence of the tetrahedra containing aluminum is balanced by the inclusion in the crystal of a cation, for example, an alkali metal or an alkaline earth metal cation. This can be expressed wherein the ratio of aluminum to the number of various cations, such as $Ca/2$, $Sr/2$, Na, K, or Li is equal to unity. One type of cation may often be exchanged either entirely or partially by another type of cation utilizing ion exchange techniques in a conventional manner. By means of such cation exchange, it has been possible to vary the properties of a given aluminosilicate by suitable selection of the cation. The spaces between the tetrahedra are usually occupied by molecules of water prior to dehydration.

Prior art techniques have resulted in the formation of a great variety of synthetic aluminosilicates. These aluminosilicates have come to be designated by letter or other convenient symbols, e.g., zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979), zeolite ZSM-12 (U.S. Pat. No. 3,832,449), zeolite ZSM-20 (U.S. Pat. No. 3,972,983), zeolite ZSM-35 (U.S. Pat. No. 4,016,245), zeolite ZSM-21 and 38 (U.S. Pat. No. 4,046,859), zeolite ZSM-23 (U.S. Pat. No. 4,076,842), and ZSM-48 (U.S. patent applications, Ser. No. 013,640, filed Feb. 21, 1979 and Ser. No. 063,230, filed Aug. 3, 1979). The entire contents of all of these patents and applications are incorporated herein by reference.

Zeolite crystallization is commonly conducted batchwise in large autoclaves, either static or stirred. It frequently requires many hours for completion, and can be, by petroleum industry standards, labor-intensive. Manufacturing processes for commercial zeolites can be classified into two groups, those using homogeneous or heterogeneous hydrogels and those based on preformed gels, for example, pelletized gels. The hydrogel processes conventionally employ large vats or autoclaves for stepwise mixing, gel aging and final crystallization, and several examples are reviewed in Chapter 9 of "Zeolite Molecular Sieves", D. W. Breck, John Wiley and Sons (1974). Although it is possible to crystallize some of these zeolites in a continuous-stream process, (as claimed, for example, in Belgian Pat. No. 869,156, July 20, 1978), stepwise, batch processes have heretofore been preferred due to the meta-stability of zeolite species and to the tendency towards nucleation and growth of undesirable zeolite phases such as P, sodalite, and analcime in the cases of zeolites X and Y, zeolite A, and mordenite, respectively, both of which are promoted by a relatively long residence time of the reactants and the products in batch systems.

In contrast, in a continuous up-flow reactor design of the present invention, meta-stability (i.e., stability of less stable zeolite species formed during the synthesis of the product but not necessarily present in the final product or product mixture) and the tendency towards nucleation of undesirable zeolite phases is very effectively controlled by easily adjustable flow rates of the reactant streams, by the stirrer design and by easily adjustable rate of the stirrer rotation.

Many prior art zeolite preparations, in addition to the frequent occurrence of competing zeolite product phases, have been characterized by a zeolite product of $SiO_2/Al_2O_3$ ratio $\leq 10$ and a high alkalinity, with pH exceeding 12 and often exceeding 14. Expressed in terms of $OH/SiO_2$ mole ratios, the alkalinity of typical reaction mixture compositions used in the production of zeolites A, X and Y are given by D. W. Breck on page 274, of the aforementioned book as 2, 2.4 and 0.8, respectively.

In contrast, the zeolites prepared by using the apparatus of the present invention form a class of zeolites characterized in their preparation by reaction mixtures of lower alkalinity and by a zeolite product of $SiO_2/Al_2O_3 > 12$. In addition, they have a constraint index of between 1 and 12, and they are generally prepared in the presence of a nitrogen- (N) or phosphorus- (P) containing organic compound. For a further description of that method and zeolites produced thereby on a continuous-stream basis, see copending U.S. application Ser. No. 47,538, filed June 11, 1979, whose entire contents are incorporated herein by reference.

As can be seen from the aforementioned copending U.S. Application, the zeolites made by the present inventive apparatus are prepared at $OH/SiO_2$ mole ratios below 1.0 and often below 0.5. The combination of low $OH/SiO_2$ and highly siliceous reaction mixtures results in gels which are quite stiff and difficult to mix. It is with these reaction mixtures that a continuous-stream crystallization process affords unique advantages, both in terms of production efficiency and in terms of product quality control. Possible advantages of a continuous-stream process include facile and independent control of nucleation and of growth stages of crystal formation by such techniques as temperature and pH gradients, by staged injection of nutrients such as SiO$_2$ and Al$_2$O$_3$ source materials and of crystallization modifiers such as N- or P-containing organic compounds, alkali metal salts, acids and bases, and by seeding.

A downflow apparatus for continuous production of zeolites is disclosed in a copending U.S. application, Ser. No. 220,556, filed Dec. 29, 1980, by E. W. Valyocsik. The Valyocsik apparatus is peculiarly adapted to a continuous downflow zeolite synthesis. For example, the stirrer blades are disposed about the vertical shaft of the stirrer at an angle of 0° to 60° and most preferably at an angle of 30° to 45° from the vertical in a downward direction to push the reactants downwardly. The internal surface of the Valyocsik's preferably tubular reactor is smooth to facilitate unobstructed downward flow of the reactants and the products.

While the Valyocsik's downflow reactor configuration may be preferable for synthesis of some zeolites under certain reaction conditions, (e.g., for reaction mixtures where seeding is not important), the up-flow reactor of the present invention is particularly desirable for synthesis of zeolites where seeding appears to play a significant role. In the upflow reactor of the present invention, the fresh reactants may enter through a mass of previously-formed product zeolite crystals which may function as seeds in systems where seeding can induce rapid zeolite nucleation and growth.

Accordingly, it is a primary object of the present invention to provide an improved outflow continuous crystallization apparatus.

It is an additional object of the present invention to provide a continuous upflow apparatus for zeolite synthesis which produces zeolites at substantially improved yields and rates of production than conventional batch apparatus.

Additional objects of this invention will become apparent to those skilled in the art from the study of the specification and the appended claims.

SUMMARY OF THE INVENTION

The present invention is directed to an upflow continuous crystallization apparatus for preparing crystalline zeolite materials comprising an elongated reactor vessel positioned substantially vertically, containing at least one, and preferably two, ingress means, and at least one egress means. The ingress means are placed in the bottom portion of the reactor vessel and the egress means in the top portion of the reactor vessel. The reactants are continuously introduced into the ingress means and the product is continuously withdrawn from the egress means. A mixing means, e.g., a stirrer, with a plurality of upwardly inclined blades is placed inside the reactor and it extends substantially through the entire length of the reactor. In addition, the inside wall surface of the reactor is preferably equipped with a number of baffle means fitting in-between the blades of the stirrer. The reactor vessel may also be equipped with a heating means, e.g., a heating coil, to maintain the reactor at the desired reaction temperature.

The crystalline zeolite product is removed at the top of the reactor vessel into at least one, and preferably two, zeolite product collectors. Two product collectors can be employed so that the product stream can be switched between the product collectors without interrupting the continuous flow of product from the reactor. The conduits from the reactor vessel to the product collectors are equipped with valves allowing the operator to isolate the product collectors from the reactor vessel. If two zeolite product collectors are employed, the valve of the first collector is used to isolate it from the reactor vessel after it is substantially filled with the zeolite product. Simultaneously, the valve to the second product collector is opened to direct the flow of the zeolite thereinto. Accordingly, the continuous flow of the product from the reactor is maintained substantially constant throughout the operation of the reactor. The apparatus also comprises spent liquids collectors, connected to the product(s) collectors, to collect byproduct spent liquids obtained during the crystallization reaction after the zeolite crystals have been separated by settling in the product collectors. A pressurized inert gas, e.g., helium, nitrogen, air, and/or steam, assures pressurization of the reactor vessel to the desired pressure to avoid boiling of the reaction mixture at the elevated reaction temperature.

The apparatus of the present invention is not limited to synthesis of a single zeolite but can be used to continuously produce a wide range of zeolites, for example, ZSM-5, ZSM-11, ZSM-35 and ZSM-48.

BRIEF DESCRIPTION OF THE DRAWINGS

The invention will be hereinafter more fully described with reference to the accompanying drawings in which.

DETAILED DESCRIPTION OF THE INVENTION

Figure 1:
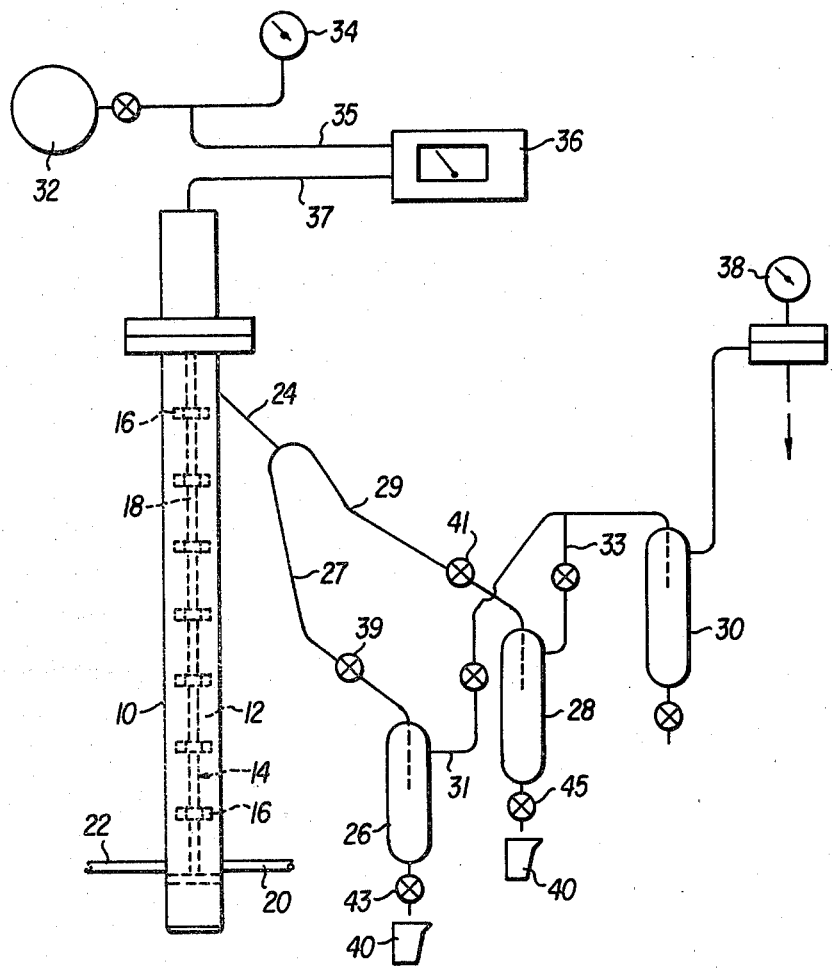
FIG. 1 is a diagrammatic elevated view of the apparatus showing the association of the various parts thereof in one embodiment.

The reactor is of a generally elongated shape, e.g., a tube, preferably cylindrical in shape, whose length and cross-sectional area depends on the desired throughput and on the product being synthesized in the reactor. The ratio of the length of the reactor to its diameter is at least 3, preferably 4 to 36, and most preferably 5 to 30.

The reactants, which will vary depending on the type of zeolite synthesized, are introduced into the reactor vessel through separate conduits, opening into the bottom portion of the reactor. For example, if it is desired to synthesize a crystalline zeolite of the ZSM-5 family (described in detail in U.S. Pat. No. 3,702,886, the entire contents of which are incorporated herein by reference), a solution of silica, e.g., silica sol (30% colloidal silica in water), or a solution of commercially available sodium silicate (comprising a mixture of sodium silicate containing 27.8% SiO$_2$, 8.4% Na$_2$O and 64% H$_2$O) is introduced into the reactor vessel through the first conduit, and a solution of nitrogen-containing ions and of alumina-containing ions, e.g., a basic solution of sodium aluminate and tetrapropyl ammonium bromide (TPA Br) or a solution of aluminum sulfate [Al$_2$(SO$_4$)$_3$.16-H$_2$O], containing 5% wt to 10% wt of tetrapropyl ammonium bromide (TPA Br) in water, is introduced into the reactor through the second conduit.

Alternatively, if it is desired to synthesize a high silica-alumina zeolite (e.g., a high SiO$_2$/Al$_2$O$_3$ ratio ZSM-5 zeolite having a SiO$_2$/Al$_2$O$_3$ ratio of 1000 to infinity), the reactants introduced into the reactor comprise substantially pure silica, having not more than 40 ppm of $Al_2O_3$ present as an impurity in the silica reactant, with no deliberately added alumina being present in the recipe. A solution of nitrogen-containing ions, e.g., TPA Br, and of acid or base, for pH adjustment, may be introduced into the reactor either through a separate second conduit or in admixture with the silica solution.

In yet another embodiment, the reactor may contain only one reactants ingress means, in which case the reactants may be premixed outside of the reactor and the mixture introduced into the reactor through the single reactants entrance means.

In a preferred embodiment, the reactor is positioned substantially vertically. The term substantially vertically as used herein designates such positioning of the reactor which enables the reactants and the products to be advanced upwardly. Thus, the reactor may be positioned at 60° to 90° from the horizontal.

The bottom portion of the reactor vessel, wherein the reactant ingress means is placed, is defined herein as the lower 33%, preferably the lower 25%, of the length of the reactor. Conversely, the top portion of the reactor vessel, containing the product egress means, is defined herein as the uppermost 33%, preferably 25%, and most preferably 10%, of the length of the reactor. It will be obvious to those skilled in the art that the exact positioning of the reactor ingress and egress means will vary for various products synthesized in the reactor and that optimum positioning of the ingress and the egress means can be easily determined by those skilled in the art on a case-by-case basis.

The reactor vessel may be equipped with a heating means, e.g., a heating coil surrounding the reactor. Thermocouples may be inserted at suitable intervals, e.g., at distances of about 12 inches along the reactor length between the reactor wall and the heating coil. The thermocouples may be connected to process controlling means, e.g., temperature controllers and digital temperature indicators. A stirring means, comprising an elongated rod, extending throughout the length of the reactor and having a plurality of blades, is placed inside the reactor vessel in such a manner that it extends substantially through the entire length of the reactor, thereby insuring efficient mixing of the reactants, inducing the upward flow of the liquids in the reactor, and preventing the buildup of heavy solid deposits on the reactor walls. The blades are disposed angularly about the rod of the stirring means at between 30° to 60°, preferably 45° to 60°, and most preferably about 60°, from the vertical in a direction angular to the vertical orientation of the rod as depicted schematically in FIG. 3. The rod with the alternating blades is continuously rotated by conventional motor means, preferably placed outside the reactor vessel, during the course of the reaction.

In addition, the inner surface of the reactor vessel preferably contains a number of baffles inclined at the similar angle as the blades of the stirrer and spaced at such intervals that they fit in-between the blades of the stirrer. The combination of the baffles and the rotating stirrer blades provides sufficient lifting action for the reactants and products to advance upwardly and sufficient turbulence for the reactants to assure proper residence time for the reaction to take place.

The pH and composition can be controlled by feed rates from the separate reactants pumps. More careful control of pH can also be achieved with pH electrodes embedded directly into the reactor or by pumping premixed viscous aluminosilicate gel directly into the inlet of the reactor.

Residence time of the reactants in the reactor vessel varies and it depends on the reactants used and on the zeolite product which one desires to produce. For example, for ZSM-5 zeolite, residence time may vary from about one (1) hour to about five (5) hours, in each case yielding a very pure zeolite (about 95% crystallinity) at rates substantially greater than those achieved with batch processes.

The product of the reaction is recovered from the reactor vessel at the top of the reactor into a product collecting means or product collector, e.g., a stainless steel or glass cylinder, connected to the reactor vessel by means of a conduit equipped with a valve means, e.g., a conventional ball valve. The valve allows one to isolate the reactor vessel from the product collecting means after the latter is substantially filled to capacity with the product of the reactor.

In a preferred embodiment, the apparatus contains at least two separate product collecting means, each connected to the reactor vessel by a conduit containing a separate valve means. When the first product collector is filled with the product to the desired degree, the valve in the conduit of that collector is closed, thereby isolating it from the reactor. Simultaneously, the valve of the second product collector is opened to direct the flow of the product thereinto. Thus, the contents of the first collector can be removed, e.g., by a valve located at the opposite end of the collector than the inlet of the product, and this mode of operation is continued until the second product collector is also substantially filled with the product, at which time the second collector is isolated and the product is directed into the first collector. The first collector must be repressurized before being placed back on stream for further product collection.

The provision of at least two product collectors assures substantially uninterrupted, continuous flow of the product from the reactor, thereby increasing yield and uniformity of the product. It will be apparent to those skilled in the art that the term "continuous" is not intended to limit the scope of the invention and that it encompasses the operation of the apparatus with periodic interruptions for diverting the flow of product from the first to the second product collectors and vice versa.

Spent liquids from the reaction mixture are also transferred to the product collectors, wherein they must be separated from the zeolite product. The separation is accomplished by allowing the heavier solid product to settle at the bottom of the product collectors, thereby forcing the lighter spent liquids to accumulate in the upper portion of the collectors. The spent liquids are then forced out of the upper portion of the product collectors by the continuously flowing stream of the product and of the spent liquids egressing from the reactor. The spent liquids are removed from the product collectors by a conduit leading to at least one, and preferably two or more, spent liquid collecting means or spent liquid collectors. This permits the apparatus to operate continuously for very long periods of time. The conduit removing the spent liquids from the product collectors to the spent liquid collectors can be positioned in any conventional manner.

If more than one spent liquid collector is used, they may optionally be connected to each other by a valve-equipped conduit to allow excess liquid from one collector to be directed to a subsequent collector (or collectors). Similarly to product collectors, each of the spent liquid collectors is preferably equipped with a valve for isolating the respective collectors from the conduit carrying the spent liquids to the collectors, and with a separate valve for removing the spent liquids from the collectors after they become substantially filled to capacity with the spent liquids. In this connection, the term "substantially filled to capacity" as applied to the spent liquids collectors and to the product collectors does not necessarily imply that the entire (100%) volume of the respective collectors must be fully occupied by the spent liquids and/or by the products, respectively. Rather, this term is used herein and in the appended claims to designate the filling of the respective collectors to whatever level is deemed appropriate for a given product by a particular operator, e.g., 70% to 95%, preferably 85% to 95%, and most preferably 90% to 95% of the respective volumetric capacity of the collectors. The exact optimum amount of liquid in the spent liquid collectors and of liquids with solid products in the product collectors can be readily determined by those skilled in the art from the preferred optimum operating conditions of the process.

The composite parts of the apparatus can be constructed from any commonly used construction materials which are inert to the reactants and to the products of the process. Thus, the reactor vessel can be made of high grade stainless steel, with inside walls of the reactor being polished to prevent deposition of solids thereon.

Alternatively, the inside reactor walls may be coated with teflon or with a similar resin, also to prevent solids deposition. The stirrer of the reactor may also be made of stainless steel with blades welded thereto, or the blades and the stirrer may be made from a unitary block of material, e.g., cast from metal, or molded from plastic. The stirrer itself can be coated with teflon or with a similar resin or a similar unreactive substance to prevent solids deposition on the stirrer. The spent liquids and the zeolite products collectors and all of the conduits can also be made of stainless steel, or similarly coated with unreactive material, e.g., teflon resin, to minimize chemical attack and/or solids deposition.

The entire apparatus assembly including the product and the spent liquid collectors, may be pressurized with an inert gas, e.g., helium (He), nitrogen (N), and/or steam, to prevent water present in the reaction mixture from boiling at the reaction temperature (which could range from 100° C. to 300° C.). The term "inert gas", as used herein designates any gas which does not react chemically with any of the process reactants or products thereof. The inert gas used may be any one of the aforementioned gases or any desired mixture thereof. It is also possible to pressurize the reactor with steam produced in situ when the aqueous contents of the reactor are heated during the course of the reaction. The pressure in the reactor must be maintained at at least 1 atmosphere (atm), preferably 10 atmospheres to 35 atmospheres, most preferably 23 to 35 atm, and it is preferred to use helium as the pressurizing gas because potential helium leaks can be relatively easily detected by means of a helium leak detector.

It will be obvious to those skilled in the art that any inert gas can be used to pressurize the reactor. Such suitable inert gases, besides He and N, are air, argon, $CH_4$, $CO$, $CO_2$, $H_2$. The reactor assembly is pressurized in a manner well known to those skilled in the art by connecting a source of an inert gas, e.g., an outlet of an inert gas pump connected to a supply of an inert gas, to the reactor vessel. The inert gas fills the reactor vessel and the spent liquids collectors and, subsequently, the remaining parts of the apparatus, thereby establishing equilibrium process pressure in the entire apparatus assembly. The inert gas circuit may also contain a pressure gauge and an adjustable relief valve, the latter to prevent the pressure of the inert gas from exceeding a predetermined maximum reaction pressure. It will be obvious to those skilled in the art that both the relief pressure valve and all of the other inert gas supply valves can be operated either manually or automatically by conventional automatic means.

The examples discussed below refer specifically to the crystallization of ZSM-5 in the present continuous down-flow apparatus but it will be apparent to those skilled in the art that the apparatus of the present invention is not restricted to the synthesis of this zeolite.

Figure 2:
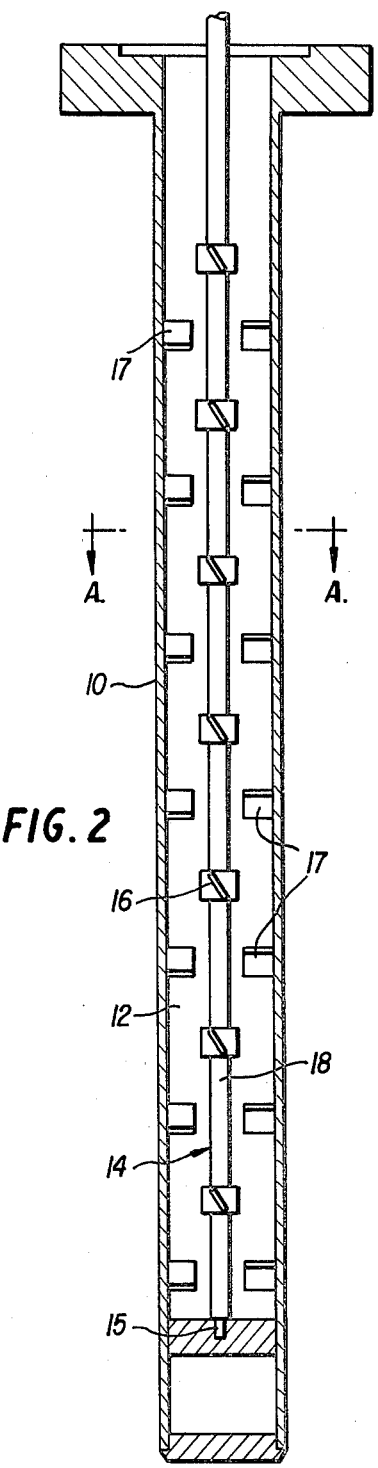
FIG. 2 is an elevated sectional view of the lower portion of the tubular reactor, without the inert gas conduit network, showing the central stirring element.
Figure 2A:
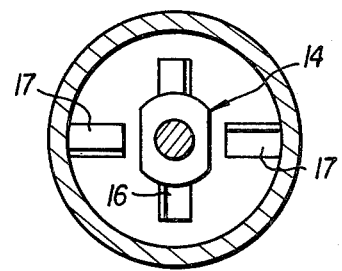
FIG. 2A is a view of a horizontal section of the reactor in FIG. 2 taken on line A—A of FIG. 2.
Figure 3:
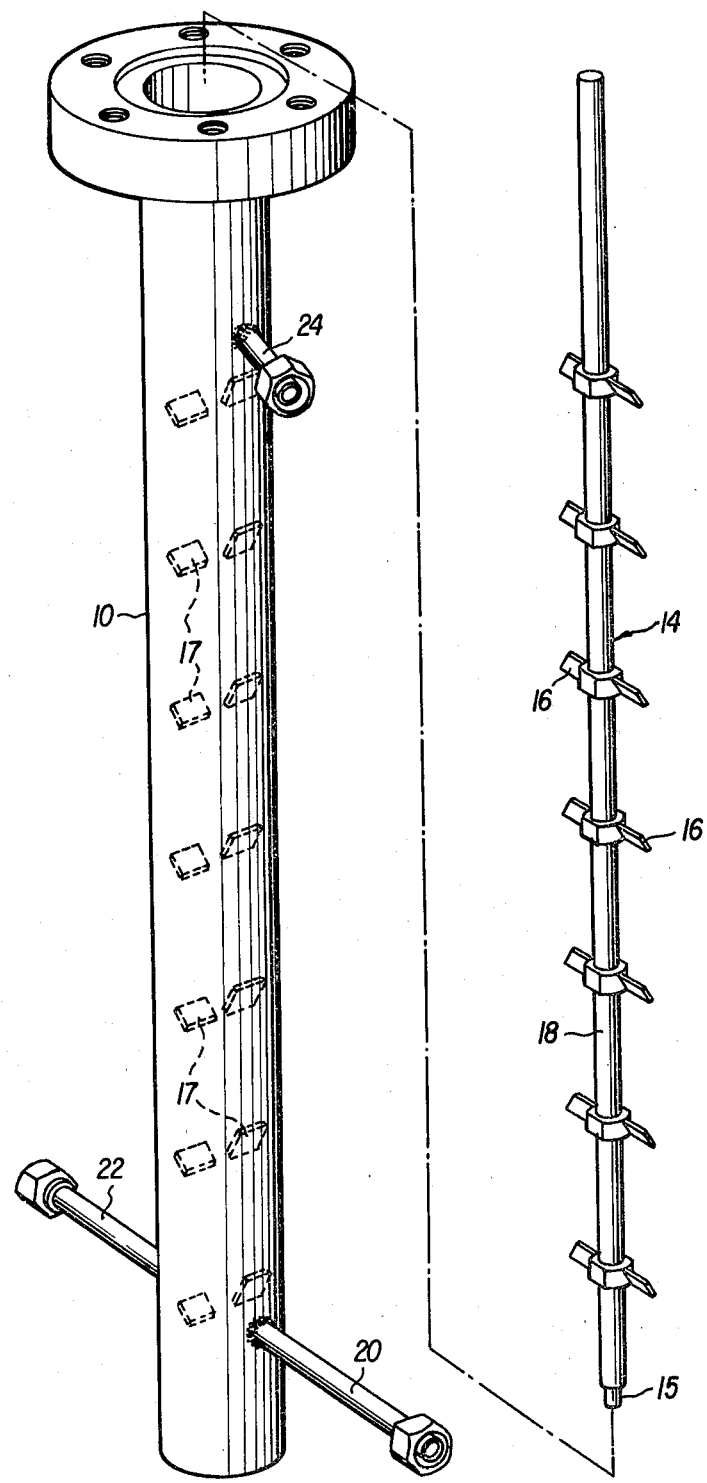
FIG. 3 is an exploded view of the reactor and of the stirring element.

Referring now to FIGS. 1-3, there is illustrated the elongated tubular reactor 10, which is further identifiable as a plug-flow reactor, containing provisions for local (segmented), variable mixing. Reactor 10 defines an elongated reaction zone 12 (FIG. 2) therein. While in this embodiment the reactor will serve as a vertical up-flow reactor, it is to be understood that the reactor can also be inclined at an angle of 60° to 90° from the vertical. A motor driven central stirring element 14 (FIG. 3) is vertically positioned inside said reaction zone. Alternating blades 16 are provided along the shaft 18 of said stirring element to aid in the movement of the reactants upwardly. The blades 16 are angularly disposed at between about 30° to 60° from the vertical, preferably about 60°, to provide an upward spiral effect and local mixing. The inside surface of the reactor contains a series of internal baffles 17 spaced in such a manner that they fit in-between the blades of the stirrer (FIGS. 2 and 2A). The baffles are inclined at an angle of 0° to 60°, preferably 30° to 45° (FIG. 3). The bottom portion 15 (FIGS. 2 and 3) of the stirring element is narrower in diameter than the remainder of the stirrer. The portion 15 is supported at the bottom of the reactor by an opening in the bottom wall thereof to assure centering of the stirring element.

Ingress ports 20 and 22 are provided for introduction of crystalline zeolite forming reactants into the reaction zone in the lower end of the reactor 10, although preformed gel may be used instead. An egress port 24 is provided at the top of the reactor for delivery of the resultant crystallized zeolite product.

Prior to the initiation of the process, reactor 10 is filled with distilled water to minimize solids deposition and reactor plugging as the system approaches equilibrium operating conditions. At that time the optional spent liquid collectors and product collectors 26, 28 contain no liquids. A source of silica, e.g., silica sol or Q-brand sodium silicate, is introduced into the reactor through a conduit 20. If the source of silica is silica sol (a solution of 30% collodial silica in 70% water), the source of nitrogen ions (in this instance, tetrapropyl ammonium bromide solution) must first be dissolved in an aqueous basic solution before it is added to the reactor. A basic solution is necessary in this instance to adjust the pH requirement necessary for the crystallization process. It has been found that if the source of nitrogen ions in a dry, powdered state is added to dry, powdered alkali, (e.g., sodium hydroxide) and water is added thereafter to the mixture, the source of nitrogen ions is destroyed in a chemical reaction taking place between the sodium hydroxide and the quaternary salt (e.g., TPA Br) needed in the reaction. However, it has also been found that if sodium hydroxide is first dissolved in water to form an aqueous basic solution, the addition of the nitrogen ions (e.g., tetrapropyl ammonium bromide) to the aqueous basic solution does not destroy the source of nitrogen ions.

Conversely, if the source of silica is a commercially available sodium silicate solution (comprising 27.8% $SiO_2$, 8.4% $Na_2O_4$, 64% $H_2O$), the source of nitrogen ions (e.g., tetrapropyl ammonium bromide) in dry powder form may be added directly to an acid solution which does not tend to destroy the source of nitrogen ions. Accordingly, no special precautions are necessary.

It will be obvious to those skilled in the art that respective reactants solutions may be premixed separately to their respective desired pH values outside of the reactor and then introduced into the reactor through a common mixing means, e.g., a mixing nozzle.

The rate of flow of the solution of silica is 30 ml/hr to 200 ml/hr, preferably 50 ml/hr to 100 ml/hr. A solution of aluminum ions [e.g., $Al_2(SO_4)_3.16H_2O$] and nitrogen ions, e.g., tetrapropyl ammonium bromide, is introduced into the reactor through a conduit 22. The reactor, and the rest of the apparatus, is at that time pressurized with an inert gas, e.g., helium, to a pressure of about 500 psig (about 33 atm) by means of the source of helium 32 and conduits 35 and 37. A pressure gauge 36 is used to monitor system pressure.

Product recovery vessels 26 and 28 (FIG. 1) are connected by suitable piping 27 and 29, respectively, to the egress port 24, for collection of the crystallized zeolite after its egress from the reaction zone. A trap vessel 30 is also provided to act in association with vessels 26 and 28 via suitable piping 31 and 33, respectively, to protect back pressure valve 38 from overflowing product liquids when the vessels 26 and 28 are filled to capacity.

The reactor and recovery vessels can be pressurized with inert gas at from 1 atmosphere to about 35 atmospheres (atm). Connected to the reactor are a source of an inert gas, e.g., helium, 32, a pressure indicator 34, and a helium flow meter 36. To prevent excessive pressure build-up, a back pressure valve 38 is also provided and it is protected by the trap 30. The pressure indicator, the flow meter and the back-pressure valve are of a conventional construction; it is believed their operation need not be described in detail.

In one embodiment, reactor conditions were 20° to 300° C. with the stirring element 14 rotating at about 20–400 rpm. The inert gas pressure was about 1 to about 40 atmospheres of helium over the liquid phase, and LHSV equalled 0.02–10.

After passing upwardly through the reaction zone to form a crystalline zeolite slurry, the slurry is recovered out of the egress port 24 into recovery vessels 26 and 28, as will be more fully described hereinbelow.

Zeolite content in the solid product can be varied from about 5 to 100%, and in this embodiment it was 80–90%. Recovery was accomplished as follows.

The recovery vessel, 26 or 28, whichever is being used for products collection, is isolated from the rest of the system by shutting the upper valves 39 or 41 and valves 46 and 47 of the recovery vessel. The recovery vessel is emptied into an appropriate collector 40 by opening the bottom valve 43 or 45 of the recovery vessels as illustrated in FIG. 1.

It will be obvious to those skilled in the art that the closing and opening of the valves 39, 41, 43, 45, 46 and 47 can be accomplished either manually or automatically by means of a programmed valve opening and closing sequence which can be monitored and controlled, by an appropriate means, e.g., by on-stream computer. The zeolite product is then recovered by filtering the slurry in a conventional manner, e.g., on a suction funnel or in a centrifuge. The filtered zeolite product is then treated in a conventional manner, for example, the zeolite product may be calcined, ion exchanged, impregnated with transition metal ions, composited with binder materials such as alumina, extruded or spray dried.

In one embodiment, the plug-flow reactor was constructed of 1¼ inch outside diameter stainless steel tubing and had a volume of 220 cc. Total length was 20 inches. It is to be understood that these dimensions can vary as required commercially or otherwise. The inside diameter, for example, can vary from about 0.5 to about 40 inches.

It will be apparent to those skilled in the art that the above examples can be successfully repeated with ingredients and under conditions equivalent to those set forth above.

From the foregoing specification, one skilled in the art can readily ascertain the essential features of this invention and without departing from the spirit and scope thereof can adapt it to various alternative applications.

What is claimed is:
1. An apparatus for preparing crystalline zeolite materials on a continuous stream basis comprising
   a substantially vertically-oriented reactor means,
   a stirring means inside said reactor means, said stirring means being operatively associated with said reactor means and comprising an elongated rod means having a plurality of blades angularly disposed about said rod means,
   said stirring means extending substantially throughout the entire length of said reactor means,
   a first and a second reactants entrance means in the lower portion of said reactor means,
   said first reactants entrance means being positioned on the opposite side of said reactor means than said second reactants entrance means,
   said first reactants entrance means continuously conveying a source of silica into said reactor means,
   said second reactants entrance means continuously conveying a source of alumina ions into said reactor means,
   at least one product exit means in the upper portion of said reactor means for continuously removing crystalline zeolite product from said reactor means,
   a multitude of baffle means on the inside surface of said reactor means, said baffle means being disposed angularly with respect to said inside surface of said reactor means and being spaced in such a manner that said baffle means are interspaced in-between said blades of said stirring means,
   said angularly disposed blades, said baffle means and said first and second reactants entrance means positioned on the opposite sides of said reactor means cooperating in advancing the reactants upwardly and preventing plugging of the first and second reactants entrance means by the crystalline zeolite materials, a heating means surrounding said reactor means, and a pressurizing means for pressurizing said reactor means with an inert gas.

2. An apparatus according to claim 1 wherein said at least one product exit means comprises a first product exit means connected to a first crystalline zeolite product collecting means, and a second product exit means connected to a second crystalline zeolite product collecting means.

3. An apparatus according to claim 2 wherein said first and said second product exit means are each connected to said first and to said second crystalline zeolite product collecting means, respectively, by means of a conduit containing a valve means.

4. An apparatus according to claim 3 wherein said inert gas is helium, nitrogen, and/or steam.

5. An apparatus according to claim 4 wherein the reactor is cylindrical in shape.

6. An apparatus according to claim 5 wherein the ratio of the length of the reactor to its diameter is at least 3.

7. An apparatus according to claim 6 wherein the ratio of the length of the reactor to its diameter is 4 to 36.

8. An apparatus according to claim 7 wherein said second reactants entrance means also continuously conveys a source of nitrogen ions into said reactor means.

9. An apparatus according to claim 8 wherein said source of nitrogen ions is tetrapropyl ammonium bromide.

10. An apparatus according to claim 9 wherein said blades are disposed about said rod means at between 30° to 60°.

11. An apparatus according to claim 10 wherein said blades are disposed about said rod means at about 60°.

* * * * *